United States Patent [19]

Neuhaeusser et al.

[11] 4,217,991
[45] Aug. 19, 1980

[54] DEVICE FOR STORING AND READYING OF MAGNETIC TAPE CASSETTES

[75] Inventors: Horst Neuhaeusser, Danziger Strasse 116, 7313 Reichenbach/Fils, Fed. Rep. of Germany; Ole Storm, Oslo, Norway

[73] Assignee: Horst Neuhaeusser, Reichenbach/Fils, Fed. Rep. of Germany

[21] Appl. No.: 902,085

[22] Filed: May 2, 1978

[30] Foreign Application Priority Data

May 2, 1977 [DE] Fed. Rep. of Germany ....... 2719493

[51] Int. Cl.$^2$ ............................................. G07F 11/00
[52] U.S. Cl. ...................................... 221/89; 221/295
[58] Field of Search .................. 221/289, 295, 89, 90, 221/91

[56] References Cited

U.S. PATENT DOCUMENTS 3,464,589 9/1969 Oden .................................... 221/295

*Primary Examiner*—Allen N. Knowles
*Attorney, Agent, or Firm*—Schwartz, Jeffery, Schwaab, Mack, Blumenthal & Koch

[57] ABSTRACT

Disclosed is an article storing and dispensing device adapted for storing and readying magnetic tape cassettes so that they can be automatically, individually dispensed from the device. The device comprises a supporting frame structure including two opposing side wall-members; at least one support member for an article to be dispensed, the support member being mounted between the opposing side wall members at an incline from the horizontal plane sufficient for the article to be dispensed to descend under its own weight; a stop member mounted on the frame structure at a position above the support member; and means associated with the support member, for selectively lifting an article to be dispensed, so that it abuts against the stop member in order to prevent the article from descending down the support member and to thereby hold the article in a ready position, and for selectively lowering the article so that it is released from abutment against the stop member in order to dispense the article by the force of gravity.

11 Claims, 3 Drawing Figures

DEVICE FOR STORING AND READYING OF MAGNETIC TAPE CASSETTES

BACKGROUND OF THE INVENTION

The invention relates to a device for storing and readying of magnetic tape cassettes, which may be taken automatically and individually from said device and brought into a working position. Each cassette is arranged so that following the release of a lock, due to the inclined position of the supporting structural part, it moves into its working position or is conducted to addition means of transport, by gravity.

A device of this general type is known from DE-OS 25 51 884. In this patent each supporting part forming an inclined bearing surface for a cassette is equipped with a single mechanical locking device, in which a magnetic anchor maintains a pawl in the locking position and in which the magnetic anchor releases the pawl upon an electrical signal. Under the effect of the gravitational force of the cassette, the pawl is then moved into its nonlocking position and subsequently returned automatically into its locking position, following the sliding out of the cassette, where it is again locked into position by the magnetic anchor. In the case of the invention of the principal patent, the pawl is formed by means of the lug of a dual arm rocker lever engaging the upper end of the cassette. The free end of said rocker lever rests on the magnetic anchor in the locking position and is unlocked by the withdrawal of the anchor upon a signal of the control magnet, thus releasing the cassette.

Other locking devices for cassettes in cassette storage devices are known. These consist essentially of pairs of sliding bolts which can be moved from the path of the sliding cassettes, said sliding bolts being connected together in lines and columns so that the sliding bolts of every line and the sliding bolts of every column can be moved out of the sliding path of the cassettes in sets and independently of each other. The cassettes are supported on inclined bearing surfaces. In this case, depending on the form of the embodiment of the known locking device, at least one of the two mechanically movable sliding bolts serves simultaneously as a stop for the cassette upon the insertion of the latter into the cassette compartment, so that the sliding bolt directly absorbs the kinetic energy of the striking cassette. Accordingly, both the stops or sliding bolts and their bearings must be suitably dimensioned; however, due to the constantly repeated impact stressing of the bolts, it is not possible to thereby exclude wear phenomena which interfer with the operating safety of the entire storage device. The same is true for the locking device of the principal patent.

SUMMARY OF THE INVENTION

It is an object of the present invention to provide a locking device in which the locking device is not stressed by forces occurring during the braking of the cassette, when impacting on the locking mechanism during insertion of the cassette.

The invention resides in the fact that in each of the compartments, above the slide path of the cassette, a fixed stop is provided and that the pawl is formed by an intermediate bottom piece supported rotatably on a transverse axle in the inclined bearing surface, this intermediate piece being spring-biased in the freely rotating direction and locked in the opposite position by the magnetic anchor, so that, during the insertion process, the intermediate piece forms a slide ramp which brings the cassette into the vicinity of the fixed stop, the ramp being depressed, after release of the lock by the magnet, into the plane of the inclined bearing surface by the weight of the cassette and returning automatically into its locked release position following the sliding out of the cassette.

In this manner, a blocking and locking device is created in which no mobile or bearing supported part serves as a stop and the entire kinetic energy is absorbed directly and exclusively by frame-mounted stops. Parts supported in bearings are stressed only by the slight static forces resulting from the weight of the cassette. Wear is thus practically entirely prevented so that simplicity may prevail both with respect to design and material technology.

The intermediate piece of the inclined bearing surface may take the form of a hinged flap, spring-loaded from below and equipped with a stop. But it also may assume the shape of a dual arm hinged plate, with the one arm on the cassette exit side spring-loaded from below and the other arm serving as a stop limiting the path of rotation. In this way, the rotating motion can be induced potentially without the use of spring force through an eccentric support. In this case, the spring force and/or the displacement of the equlibrium must be chosen so that the flap rotates upwardly with certainty against the friction generated by sliding of the flap against the magnetic anchor after the magnet is deenergized and so that it subsequently rotates downwardly under the weight of the cassette.

Other features, objects and advantages will be found in the following detailed description of preferred embodiments in which the invention is explained with the aid of the attached drawings.

DETAILED DESCRIPTION OF PREFERRED EMBODIMENTS

Figure 1:
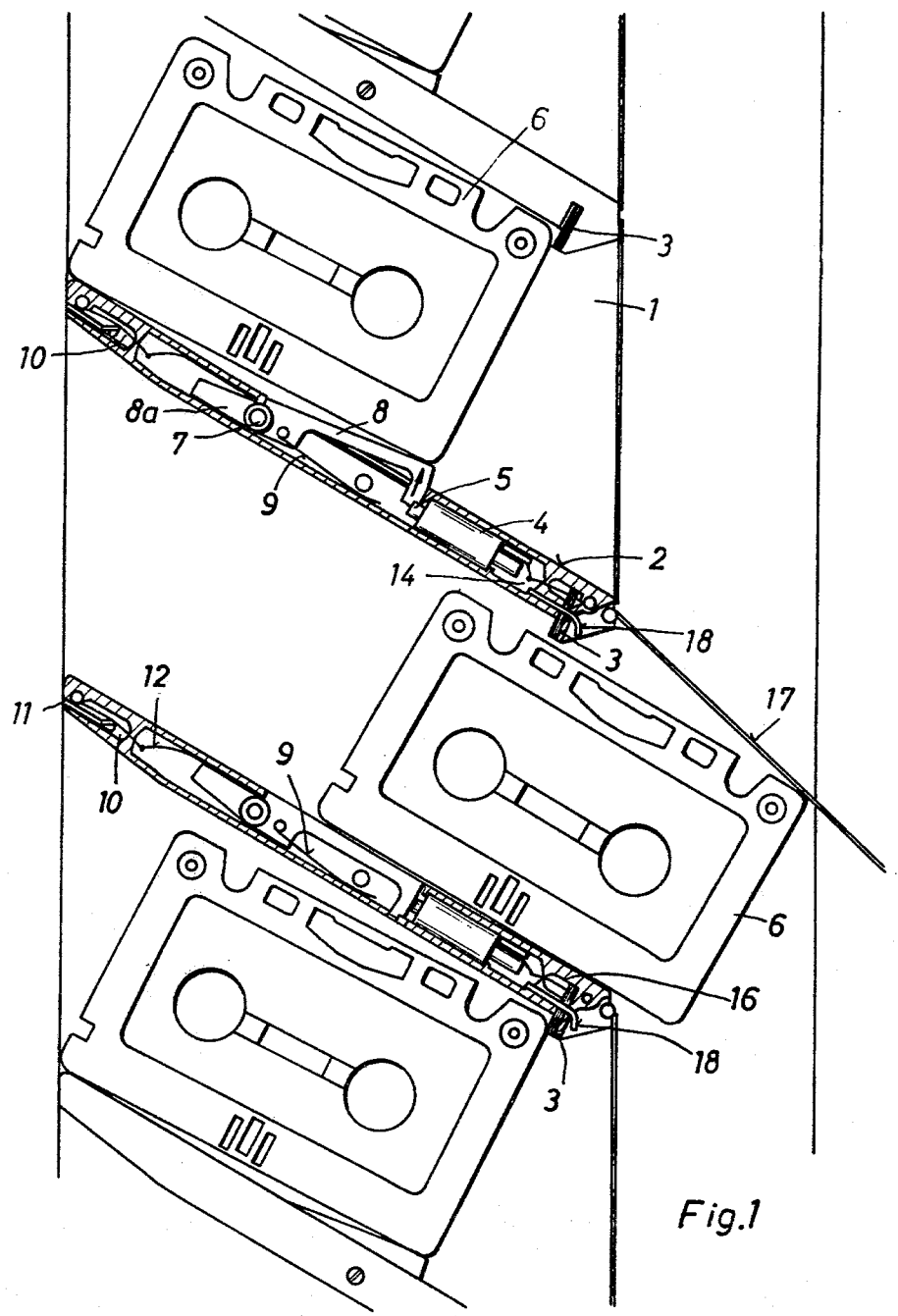
FIG. 1 is a partial side view of a compartment column with the locking device of the invention.

In the drawing, 1 indicates the side wall of a compartment column, said side wall being electrically insulated and serving as the external power lead to the magnetic coil. The inclined bearing surfaces, designated as a whole by 2 and dividing the individual compartments, are arranged on the side wall. The numeral 3 indicates the electrical current return extending through all of the columns in the longitudinal direction and being electrically insulated with respect to the walls 1. A magnetic coil 4 with the anchor 5 is arranged in the inclined bearing surface; it serves to latch the locking device for the cassette 6 in the locked position. In each of the compartments, a frame-mounted stop is provided above the slide path of the cassette, which stop is formed in the illustrated embodiment in a particularly advantageous manner by the electrical current return bar 3. Further, in the inclined bearing surface 2 is arranged an intermediate bottom piece 8 in the form of a dual arm hinged plate, which is biased by the spring 9 in the direction of free rotation indicated by the arrow and the rear arm 8a of which serves as a stop to limit the angle of rotation.

In order to fasten the bearing surface to the current-conducting side wall, the bearing surface is provided at its rear end with a longitudinal slit 11 terminating in a chamber 10, while there are arranged, on the one hand, in the chamber 10 a contact spring 12 freely spanning the chamber and, on the other hand, (see FIG. 2) on the partition wall 1 a horizontally extending ridge 13, which is in electrical contact with said wall 1, for example, in the form of a strip cut and bent out from the sheet metal. Correspondingly, at the front end of the inclined bearing surface there is provided a transverse slit 15 (FIG. 2) terminating in a chamber 14, with a contact spring 16 being arranged in the chamber 14 and freely spanning said chamber. The distance between the conducting elements 3 and 13 corresponds to the distance between the transverse slit 15 and the approximate center of the chamber 10. The contact springs 12 and 16 are electrically connected with the contacts of the magnet coil 4. The numeral 17 designates a simple hinged flap which limits the dropping path for the cassette. A safety pin for the inclined bearing surface is designated by 18.

Figures 2A, 2B:
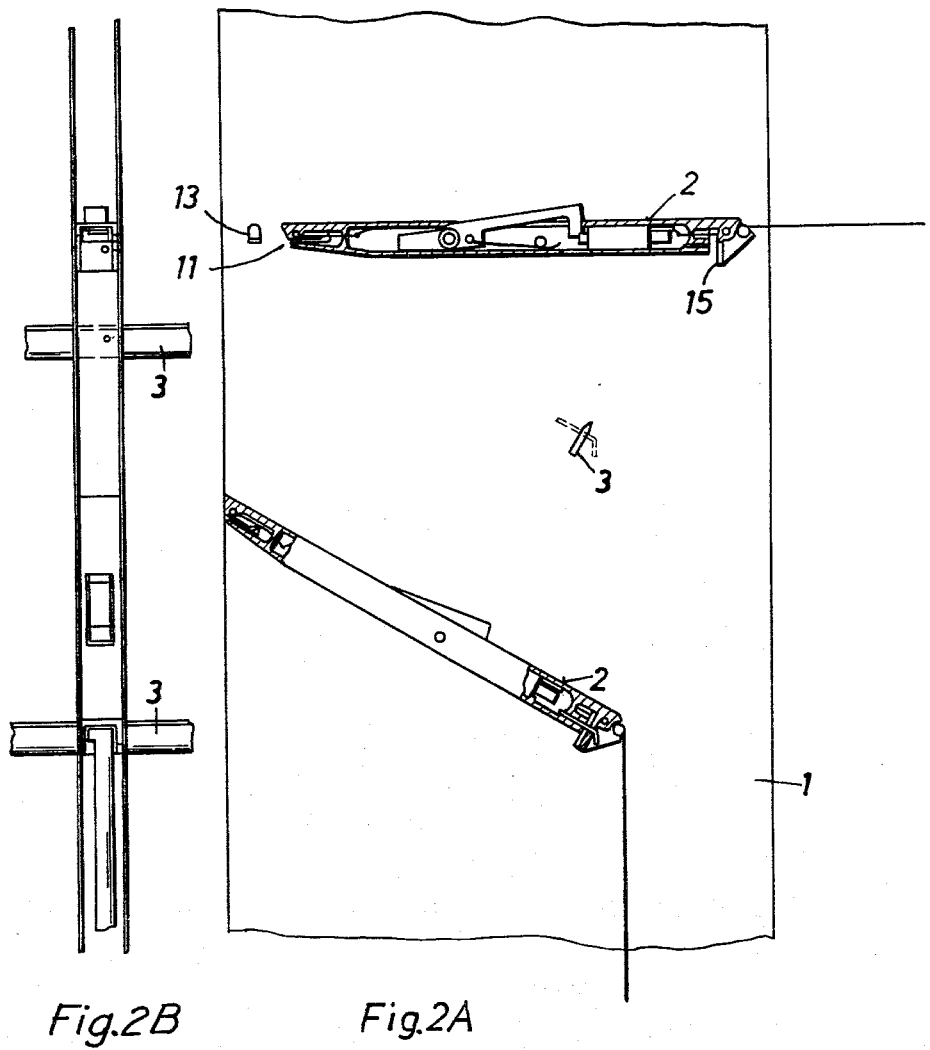
FIG. 2 is a schematic representation of the mounting of an inclined bearing surface in the storage device.

To install the inclined support surface (see FIG. 2), the support surface is first slid, in the horizontal position shown in the upper part of FIG. 2, onto the horizontal strip 13 by means of the slit 11, until the strip enters the chamber 10, whereupon the support surface is rotated downwardly until the bar 3 which is arranged in an oblique position engages the slit 15 and the bar 3 rests against the contact spring 16. As the result of the rotation of the support surface, in combination with the horizontal extension of the strip 13, electrical contact with the side wall is likewise established with the bend stressing of the contact spring 12.

In the cassette compartment, which is empty at the time of the installation, the hinged plate 8 assumes its position in the upper compartment as shown in FIG. 1, under the effect of the spring 9. In this position, the hinged plate is rotated until the plate arm 8a impacts the bottom wall, while forming a slide ramp, and is locked in this position by means of the magnetic anchor 5. During the insertion process, the incoming cassette slides upwardly on the hinged plate 8 and thus arrives in the vicinity of the frame-mounted stop formed by the current conducting bar 3 for the row of compartments located above it. This stop therefore absorbs the entire kinetic energy of the cassette without subjecting any of the mechanical parts to stress. This also yields the additional advantage that the slight shock resulting from the operation generates a contact movement between the bar 3 and the contact spring 16, which prevents the occurrence of contact resistance or contact interruptions.

To discharge the cassette, the magnetic coil is energized, and because of the withdrawal of the anchor 5, the hinged plate 8 is unlocked. This plate is then rotated into the plane of the inclined bearing surface by the weight of the cassette. The cassette 6 thus moves out of the vicinity of the stop 3 and due to its own weight slides outward when the flap 17 is opened. After the cassette has left the area of the hinged plate 8, the plate returns into its outwardly rotated position under the pressure of the spring 9 and is locked there by the spring-biased anchor 4 as a result of the deenergizing of the magnet 5 which takes place in the meantime.

What is climed is:

1. An article storing and dispensing device adapted for storing and readying magnetic tape cassettes so that they can be automatically, individually dispensed from the device, said device comprising:

a supporting frame structure including two opposing side wall-members;

a least one support member for an article to be dispensed, said support member including an inclined bearing surface mounted between said opposing side wall members at an incline from the horizontal plane sufficient for the article to be dispensed to descend under its own weight, whereby there is defined an article storing compartment;

a stop member mounted on said frame structure at a position above said inclined bearing surface at the forward end of said article storing compartment; and means associated with said support member, for selectively raising an article to be dispensed above said inclined bearing surface upon insertion of the article into said article storing compartment, so that the article abuts against said stop member in order to prevent the article from descending down said support member and to thereby hold the article in a ready position, and for selectively lowering the article so that it is released from abuttment against said stop member in order to dispense the article along said inclined bearing surface by the force of gravity.

2. The device as defined by claim 1, wherein said selective raising and lowering means includes a raising member upwardly-biased to an extent that it assumes a normal, upward position when unloaded and normally assumes a position flush with said bearing surface of said support member when loaded with the article to be dispensed and further including means for selectively locking said raising member in the upward position.

3. The device as defined by claim 2, wherein said raising member comprises a pawl rotatably mounted on said support member and a spring biasing said pawl upwardly.

4. The device as defined by claim 3, wherein said selective locking means comprises a magnetically actuated pin selectively engaging with said pawl when the pawl is in its upward position.

5. The device as defined by claim 4, wherein said magnetically actuated pin includes a spring means for biasing said pin toward said pawl and a selectively energizable magnetic coil for selectively withdrawing said pin away from engagement with said pawl.

6. The device as defined by claim 5, wherein said pawl comprises the form of a dual arm hinged plate with one arm being spring-loaded from below and the other arm serving as a stop limiting rotation of the plate.

7. The device as defined by claim 8, wherein said support member comprises at its rear end a longitudinal slot terminating in a first chamber, and wherein the device further comprises a contact spring freely spanning said first chamber, and a protrusion extending horizontally from one of said side wall members and conductively connected with said wall member.

8. The device as defined by claim 7, wherein said protrusion comprises a piece cut and bent out from said side wall member.

9. The device as defined by claim 7, wherein said support member comprises on its front end a transverse slot terminating in a second chamber, and further comprising a contact spring freely spanning said second chamber, with the distance between said stop member and said protrusion corresponding to the distance between said transverse slot and the approximate center of said first chamber, whereby said protrusion rests in said first chamber and said stop rests in said transverse slot.

10. The device as defined by claim 9, wherein said protrusion comprises an electrical lead, said stop member comprises an electrical current lead-away bar and said device further comprises means for providing electrical connection between said magnetic coil and said electrical lead and lead-off bar.

11. The device as defined by claim 1, wherein said device comprises a plurality of said elements, defining a plurality of article holding compartments.

* * * * *